Oct. 13, 1925.
E. M. POLK
1,556,954
SAFETY CONTROL FOR PUNCH PRESSES
Filed March 25, 1921   3 Sheets-Sheet 2
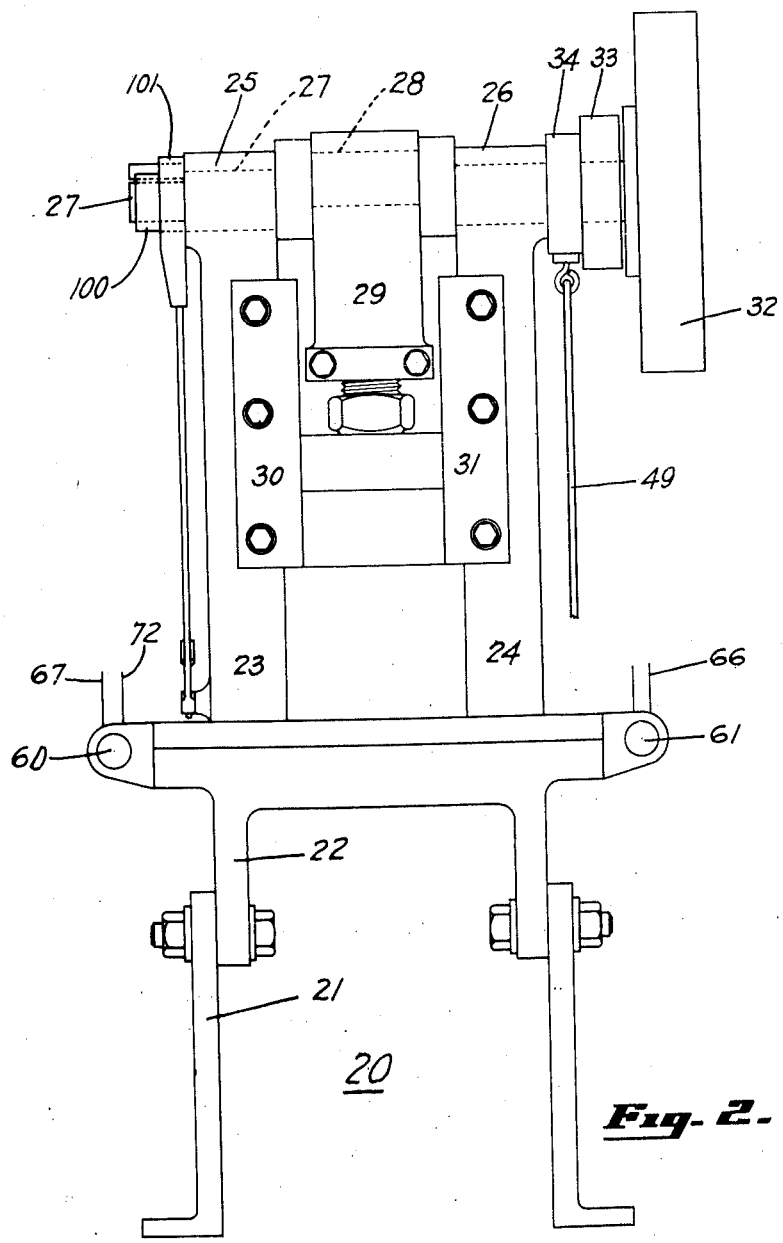
Fig-2-
Witnesses
Inventor
Earl M. Polk
Forest B. Mac Nab
Attorney Oct. 13, 1925.
E. M. POLK
1,556,954
SAFETY CONTROL FOR PUNCH PRESSES
Filed March 25, 1921   3 Sheets-Sheet 3
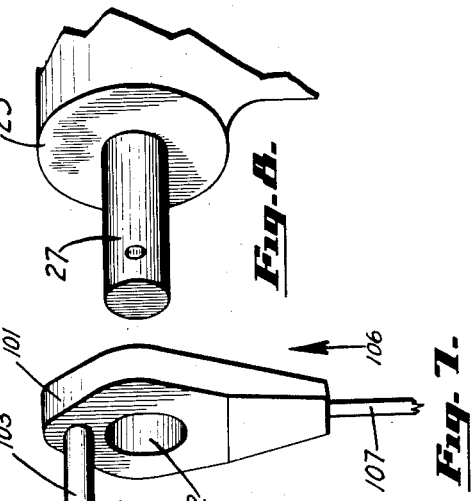
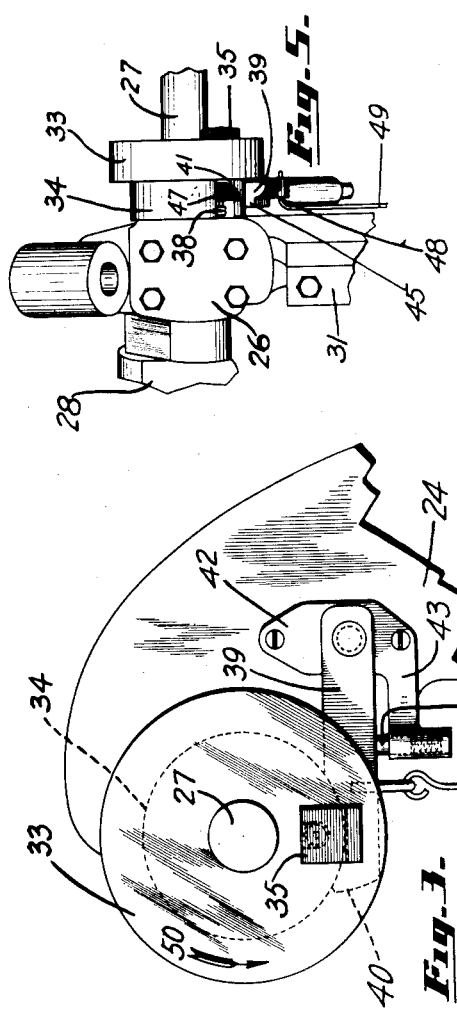
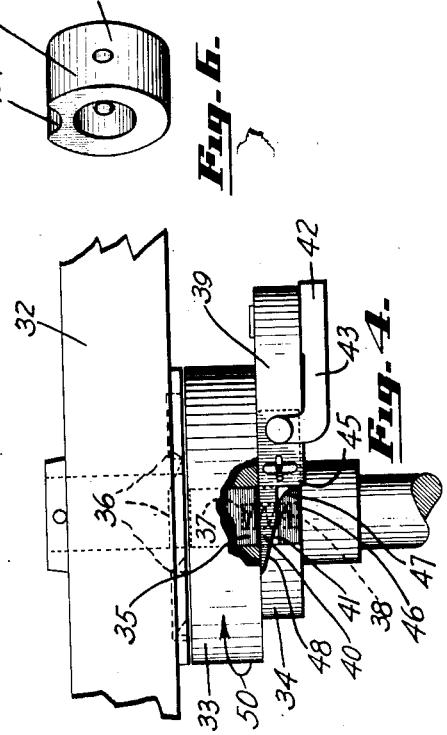
Witnesses
Irvin A. Greenwald
Walter W. Riedel
Inventor
Earl M. Polk
Forrest B. MacNab
Attorney Patented Oct. 13, 1925.

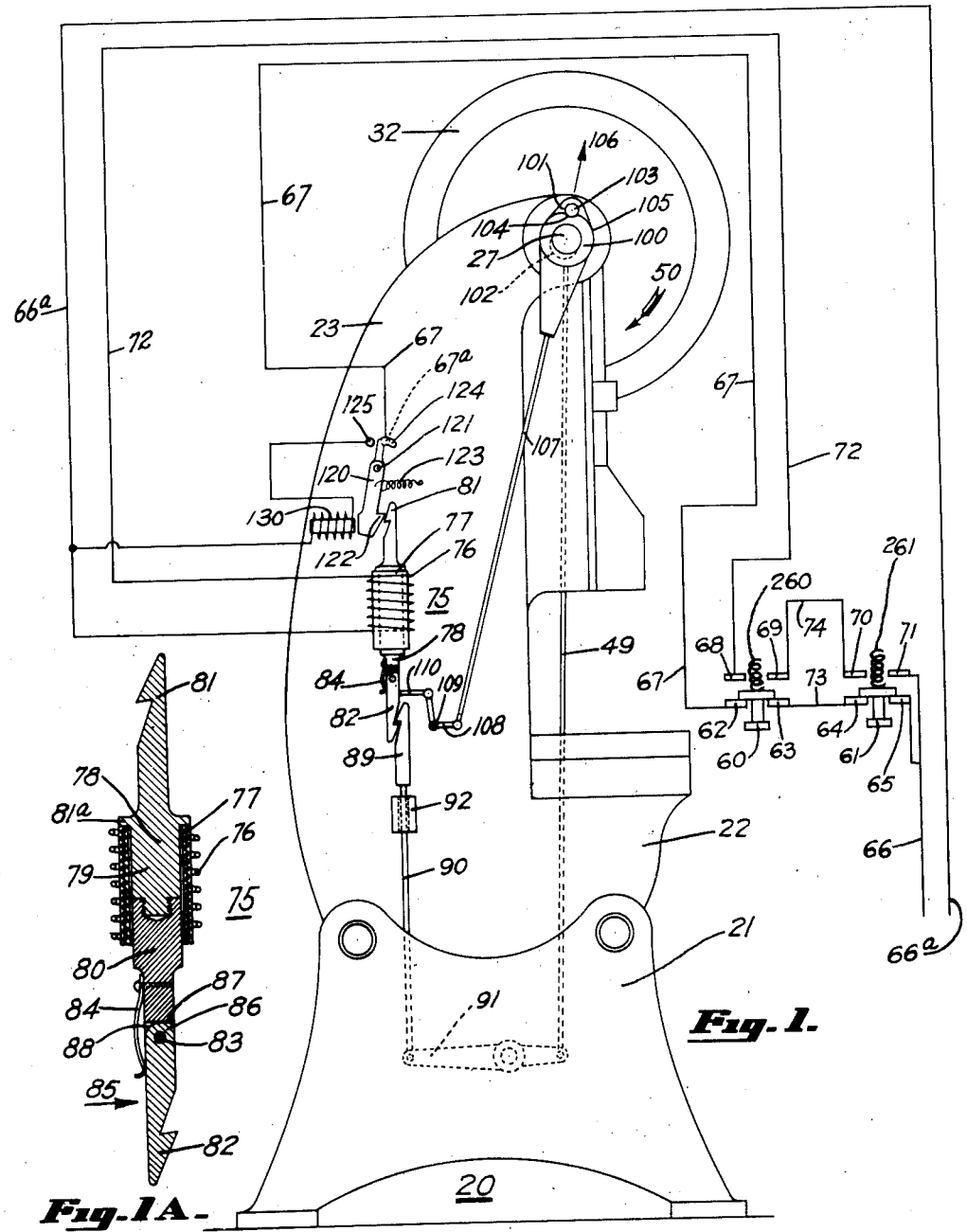

1,556,954

UNITED STATES PATENT OFFICE.

EARL M. POLK, OF DAYTON, OHIO, ASSIGNOR TO THE DAYTON ENGINEERING LABORATORIES COMPANY, OF DAYTON, OHIO, A CORPORATION OF OHIO.

SAFETY CONTROL FOR PUNCH PRESSES.

Application filed March 25, 1921. Serial No. 455,457.

*To all whom it may concern:*

Be it known that I, EARL M. POLK, a citizen of the United States of America, residing at Dayton, county of Montgomery, State of Ohio, have invented certain new and useful Improvements in Safety Controls for Punch Presses, of which the following is a full, clear, and exact description.

This invention relates to a controlling system for a power driven machine normally disconnected from the driving element but provided with a clutch for connecting said machine to the power driving means.

One object of the invention is to provide a controlling system for connecting the power driving means to the machine, said system to include manually operated means necessitating the use of both of the operator's hands and so arranged as to require the conjoint operation of both hands to two different positions, one for causing the machine to be set into operation, and the other to restore the control system so that a subsequent operation can be performed.

Further objects and advantages of the present invention will be apparent from the following description, reference being had to the accompanying drawings, wherein a preferred embodiment of the present invention is clearly shown.

In the drawings:—

Fig. 1 is a part diagrammatic, part structural view of the system applied to a punch press, the latter being shown in side elevation.

Fig. 1^A is a sectional view of the plunger type electromagnet shown in Fig. 1.

Fig. 2 is a front elevation of the punch press and some of the component parts of the system. Other parts of the system are omitted in this view for the sake of clearness.

Fig. 3 is a detail side view of the clutch and its controlling latch.

Fig. 4 is an inverted plan view of Fig. 3.

Fig. 5 is a perspective front view of the view shown in Fig. 3.

Fig. 6 is a view of the disconnecting cam element secured to the crank shaft of the punch press.

Fig. 7 illustrates the rider and block associated with the cam shown in Fig. 6.

Fig. 8 shows the portion of the crank shaft of the punch press that carries both the cam and cam rider and block.

Broadly speaking, the present control system includes a clutch for connecting or disconnecting the driving and the driven members of the machine, a clutch actuator, automatic means for disconnecting the clutch actuator from the clutch in order that the machine will not repeat, and means for reconnecting the clutch and clutch actuator. Before the clutch actuator can function, at least two manually operable members must be moved to a certain position; and, before the reconnecting means can function, these same manual members must both or all be restored to original position. The manual members are placed far enough apart so as to require the use of both hands of the operator.

Referring to the drawings a punch press 20 is shown having a base 21 which is adapted to support a body portion 22. This body portion 22 is provided with two oppositely disposed standards 23 and 24 at the upper end of which are formed heads or bearing retainers 25 and 26 respectively. Supported by these heads 25 and 26 is the driven member or crank shaft 27, having an eccentric portion 28 to which is connected the reciprocating element 29 of the punch press. Said reciprocating element is adaped to be moved up and down between the guides 30 and 31 secured to the standards 23 and 24 respectively.

The driving member or flywheel 32 is rotatably carried at the one end of the crank shaft 27. Between this driving member 32 and the head 26, the crank shaft is provided with enlarged flange portions 33 and 34, the 33 being adjacent to and in close proximity to the hub of the driving member.

*Clutch.*

A member 35, which may be termed the clutch pin, is slidably positioned in a channel formed in both the flange portions 33 and 34, and is adapted to be moved into engagement with either one of a series of notches 36 formed in the driving member 32 as shown in Fig. 4 by means of a spring 37 interposed between said pin 35 and ear 38 formed in the channel in flange portion 34. The engagement of the pin 35 with notches 36 in the driving member is, however, controlled by the operation of the clutch latch or dog 39 which as is clearly shown in Figs. 3 and 4, is provided with a wedge portion 40, normally adapted to fit within a cut away portion 41 of the pin 35. The latch 39 is secured and fulcrumed to a bracket 42 mounted on the standard 24. This bracket is provided with a projecting arm 43, having a spring pressed plunger 44 so positioned relative to the latch 39 that this plunger engages with and is adapted to hold said latch in a position to occupy the cut away portion of the pin 35 as shown in Fig. 4. The latch 39 is also provided with a portion 45, adapted to engage the portion 46 of pin 35 for purposes hereinafter described. As shown in Fig. 4, the portion 46 of pin 35 has a rounded face 47 which is adapted to cooperate with the inclined face 48 of wedge 40 to withdraw the pin out of engagement with the driving member as will be more fully described. A rod 49 is shown connected to the latch 39, the opposite end of said rod being connected to the latch operating element of the controlling device.

A short description of the operation of this clutching device will now be made. When the rod 49 is operated in a direction of arrow 3, the latch will be retracted from the cut-away portion 41 of pin 35 thereby permitting the spring 37 to move said pin through the channel in the flange portions 33 and 34 into engagement with one of the series of notches 36 formed in the hub portion of the rotating driving member 32. This will of course cause the flange portions 33 and 34 to rotate with the driving member and in turn cause the entire machine to function. This functioning of the machine will continue as long as the latch is held out of engagement with the pin 35. However, as soon as the force exerted on the rod 49 is released, the plunger 44 will press the latch into engagement with the periphery of the flange 34 and in the path of the pin 35 being rotated with the flanges 34 and 33 in a direction of the arrow 50. As soon as the rounded face 47 of pin portion 46 engages with the inclined surface 48 of wedge portion 40, the pin will be moved out of engagement with the driving member 32. In order that the reciprocating elements of the machine will be caused to stop in the exact upper position, the latch is provided with a stop or portion 45 which is adapted to engage with the pin portion 46 as shown in Fig. 4.

From the aforegoing description it may be seen that protracted operation of the rod or latch control 49 will permit repetitional cycles of machine operation. On the other hand however, if the rod is released after the latch 39 has been retracted from engagement with the pin 35 and said pin has slid into engagement with a notch of the driving member 32 the machine will not repeat but will be permitted to operate for a single cycle only.

In carrying out the objects of the present invention of providing a safety controlling system for punch presses, there is provided two manually operable circuit closing switches 60 and 61. When in normal position as shown in Fig. 1, these switches bridge the stationary contacts 62, 63 and 64, 65 respectively, thereby closing a circuit from the main lead wire 66 to the wire 67. These switches 60 and 61 are adapted to be moved out of normal circuit closing position into a second position where they bridge the stationary contacts 68, 69 and 70, 71 respectively, thereby closing a circuit from the main lead wire 66 to wire 72. The wires 73 and 74 connect the stationary contacts 63, 64 and 69, 70 respectively, as shown in the drawing. It will of course be understood that one of these switches 60 or 61 and its cooperating stationary contacts could be dispensed with and the circuits closed by means of only one switch. However, such an arrangement would greatly reduce the factor of safety in the controlling system as it would permit the operator the free use of one hand for other purpose during the operation of the machine, as will be more detailedly described hereinafter.

*Clutch actuator.*

The clutch actuator will now be described.

Secured to the body portion 22 of the machine and placed longitudinally therewith is a plunger type electro-magnet 75, including a magnet coil surrounding a shell or housing 77 clearly shown in Fig. 1^A. Slidably arranged within the housing 77 is a plunger armature 78 comprising an upper non-magnetic portion 79 and a lower portion 80 consisting of any suitable magnetic material such as iron and the like. The magnetic portion 80 of the plunger is so arranged relative to the coil 76 that when said coil is energized it will attract the magnetic portion 80 of the armature and tend to pull it upward into housing 77. A flange 81$^a$ is provided on the portion 79 which permits the plunger armature 78 to drop into a predetermined normal position when the coil 76 is deenergized.

The upper or non-magnetic end of the plunger armature is formed into a hook 81 which cooperates with certain other elements to perform certain functions as will be described later. Secured to the magnetic or lower end 80, of the plunger armature 78, is a movable hook or dog 82, fulcrumed on the pin 83. This dog is held in normal, aligned position with the plunger armature by means of a spring 84 tending to push said dog in the direction of the arrow 85 until the square corner 86 on the dog 82 abuts against the shoulder 87 formed on the plunger armature portion 80. The rounded face 88 on the dog 82 permits movement of said dog in the direction opposite to arrow 85.

When the plunger armature 78 is in normal or unattracted position, the dog 82 is adapted to engage with a cooperating hook 89 connected to the clutch latch 39 by means of rod 90, lever 91 and rod 49. This hook 89 is free to move up and down to operate the latch 39, and is held in relative vertical position to the plunger armature dog 82 by means of the guide 92 through which the rod 90 passes.

Nonrepeat Mechanism.

The automatic means for disconnecting the clutch actuator from the clutch will now be described. This means causes the clutch to be disengaged before the end of a cycle of machine operations so that the machine will not repeat.

Referring to the Fig. 2, the crank shaft 27, is shown projecting beyond the head 25 and supporting a cam 100 and cam-rider block 101. By referring also to Figs. 6, 7 and 8, a more detailed showing of these elements can be seen. The cam-rider block 101 has an elongated hole or opening 102, said block being adapted to be loosely supported on the crank shaft extremity 27. A cam-rider post 103 is carried by the block 101 said post being adapted to ride on the face of the cam element 100 carried by and secured to the shaft 27. Normally the rider-post 103 lies in the indent 104 of the cam 100. However, when the cam is rotated the posts 103 will ride upon the surface 105 of the cam thereby tending to shift the block 101 in the direction of the arrow 106 shown in Fig. 1, for purposes to be set forth. The block 101 has one end of a rod 107 connected therewith, while the other end of said rod is connected to a bell-crank lever 108 fulcrumed at 109 said lever having an arm 110 contacting with the dog 82. Movement of the block 101 in the direction of the arrow 106, causes the bell-crank lever to be moved about its fulcrum 109, the arm 110 exerting pressure in the direction of the dog 82, continued movement of said arm in this direction, resulting in the disengagement of the dog 82 with hook 89.

Clutch actuator retainer and restorer.

The means for permitting the clutch actuator to be reconnected with the clutch will now be described.

As has been mentioned heretofore, the plunger armature 78 is provided with a hook portion 81 at its upper end. This hook portion 81 is adapted to be engaged by a cooperating hook 122 formed on the clutch actuator retainer or armature dog 120, when the coil 76 is energized and has drawn the magnetic portion 80 of said plunger armature upwardly and into the housing 77. The spring 123 tends to cause engagement between the hooks 81 and 122 when the hook 81 has reached a certain high point, and will tend to hold said hooks in such engagement until the armature dog has been attracted by the electro-magnet or clutch actuator restorer 130 with which it is associated. The energization of the electro-magnet 130 is dependent upon the closing of the circuit at the contacts 62, 63 and 64, 65 and at the open gap at terminals 67ª and 125. Closing of the circuit at the contacts 62, 63 and 64, 65 is dependent upon the operation of the manually operable switches 60 and 61 respectively, to normal position. The circuit closing means for bridging the gap between points 67ª and 125 is provided in connection with the armature dog 120 and comprises a contact arm 124 always in contact with terminal 67ª but adapted to be moved into engagement with terminal 125 when the hook 122 on armature dog 120 engages with the hook 81 thus closing the circuit through the coil of the electro-magnet 130.

Having described the various elements of the system, the mode of operation will now be set forth:

Assuming that the driving member 32 is rotated by means of a belt connection to some source of power not shown in the drawings, and assuming that the operator desires to operate the machine, he shifts the switches 60 and 61 with his left and right hand respectively, to the position where the said switches will bridge the gap between stationary contacts 68, 69 and 70, 71. Current will now flow from the source of electrical current through main lead or feed wire 66, to contact 71, across the bridging element of switch 61 to contact 70, wire 74, contact 69, bridging element of switch 60, contact 68, wire 72, through magnet coil 76 of electro-magnet 75, and back through the opposite feed wire 66ª to the source of electrical current. This will energize the electro-magnet 75, causing it to attract its plunger armature 78 and move it in an upward direction. The plunger armature has a hook or dog 82 normally engaged with the hook 89 connected to the clutch latch 39 by means of rod 90, lever 91 and rod 49. The moving of the plunger armature 78 upwardly by the electro-magnet coil 76 will cause the clutch latch 39 to be pulled down to permit the pin 35 to connect the driving member 32 and driven member 27 thus causing said driven member to be rotated by and with the driving member 32. This rotation of the driven member 27 will also cause the cam 100 to be rotated thus forcing the cam-rider post 103 out of the indent 104 which in turn will cause the block 101 and its rod 107 to be moved in a direction of the arrow 106, see Fig. 1. Movement will hereby be transmitted to the bell-crank lever 108 to exert pressure upon the dog 82 and force it out of engagement with the latch hook 89. This will permit the hook 89 and latch 39 to be restored to their normal position due to the pressure exerted on the latch by the spring pressed plunger 44 carried by bracket extension arm 43 thus causing the machine or driven member to be disconnected from the driving member and stop in a predetermined up position as has been detailedly described in the first portion of this specification. It may be seen that the disengagement of the dog 82 and hook 89 will not take place until the clutch has connected the driving and driven members, assuring the functioning of the machine. After the machine has thus started to function the above mentioned disengagement of dog 82 and hook 89 may be instituted as soon as possible, to permit only one cycle of machine operation.

Operation of the plunger armature 78 by its cooperating magnet coil 76 will, while operating the latch hook 89, also cause said plunger armature 78 to be moved in position to permit the hook portion 122 of armature dog 120 to engage the hook portion 81 of the plunger armature, due to the effect of the spring 123 pulling the dog 120 in a direction of the plunger armature hook 81. This will detain the said plunger armature 78 and prevent its dropping into normal position to connect the dog 82 and latch hook 89. The movement of the armature dog 120 into engagement with hook 81 will also cause the contact arm 124 associated with said armature dog 120 to bridge the gap 67ª and 125 in the magnet coil 130 circuit.

Now before the operator can cause the machine to repeat its cycle of operation he must shift the switches 60 and 61 back to their normal position. In this position the bridging elements of said switches will close circuits between contacts 62, 63 and 64, 65 respectively, permitting current to flow through wire 66, contact 65, switch 61, contact 64, wire 73, contact 63, switch 60, contact 62, wire 67, to terminal 67ª, arm 124, terminal 125, through magnet coil 130 and back through wire 66ª.

This will energize the electro-magnet 130, thereby attracting and moving the armature dog 120 out of engagement with the hook portion 81 of plunger armature 78. Upon being released the plunger armature 78 will drop into normal position thereby causing the dog 82 to again engage with the latch hook 89 due to the pressure exerted by spring 84, and thus set or restore the system to normal condition preparatory for a repeat cycle of operation of the machine. The shifting of the armature dog 120 out of engagement with plunger armature 78 will also tend to break the electro-magnet 130 circuit at the terminals 125 and 67ª thus eliminating the waste of current through this circuit while the system is held in normal operating condition.

The switches 60 and 61 can be manually operated both to operating and to normal or restoring position, or springs 260 and 261 can be employed to automatically return the switches to system restoring position after they have been shifted to their machine operating position and are released by the operator.

From the foregoing description it is apparent that the present control system requires the manual operation of two manually operable control elements or switches which are spaced far enough apart to necessitate the use of both hands of the operator in order to bring the machine into operation. One advantage of this control system is to require that both hands of the operator be placed out of danger before the machine can be set in motion. Although the switches 60 and 61 be held in upper position (as viewed in Fig. 1), the machine will not perform a repeat operation.

Another advantage is obtained by requiring the operation of both the manually operated means to normal or restoring position, as shown in Fig. 1, before a subsequent operation can be performed. This method of controlling the clutch operating system tends to entirely eliminate the possibility of "staking" or "fixing" or otherwise tampering with either of the two manually operable means in the machine operating position while attempting to perform the entire controlling function by means of the single remaining manual means and thus destroying the value of the system as a means for protecting both hands of the operator.

While the form of mechanism herein shown and described constitutes a preferred form of embodiment of the invention, it is to be understood that other forms might be adopted, all coming within the scope of the claims which follow.

What I claim is as follows:

1. In a controlling system for a machine having a driving and a driven member normally disconnected, the combination with a clutch for connecting said members, of a clutch actuator normally in position for connection with the clutch; means for controlling the clutch actuator including two manually operable members, said control means requiring the operation of both manual members into a certain position; automatic means for disconnecting the clutch actuator from the clutch to prevent a repeat operation; and means for causing the clutch actuator to be reconnected with the clutch, said last means being operable only when both said manual members have been moved into another position.

2. In a controlling system for a machine having a driving and a driven member normally disconnected, the combination with a clutch for connecting said members; of a clutch actuator normally in position for connection with the clutch; means for controlling the clutch actuator including two manually operable members, said control means requiring the operation of both manual members into a certain position; automatic means for disconnecting the clutch actuator from the clutch and for causing the clutch to disconnect the driving and driven members; means for retaining the clutch actuator in its operating position while disconnected from the clutch; and means for restoring the clutch actuator to normal position said last means including said manual members and requiring the actuation of both said manual members to another position.

3. In an electrical controlling system for a machine having driving and driven members, the combination with a clutch adapted to connect said members; of a clutch controlling latch; a hook attached to the latch; an electro-magnet including a plunger having a movable dog secured to the plunger, and a spring for holding the dog in normal position, said dog being adapted to engage with the latch hook; two manually operated switches having connection to a source of electric current and operable to one position for closing the circuit between the current source and the electro-magnet whereby the clutch controlling latch will be operated to permit the clutch to connect the driving and driven members; automatic means for disengaging the dog from the hook after the operation of the clutch controlling latch in order to disconnect said members; and means brought into effect by the return of both of the switches to normal position to permit the dog to reengage the hook.

4. In a controlling system for a machine having a driving and a driven member normally disconnected, the combination with a clutch for connecting said members; of clutch shifting means; an actuator for the shifting means including an electro-magnet and armature; two switches for rendering the magnet operative when both switches are moved into a certain position; means actuated by the machine for disconnecting the armature from the clutch shifter; means for retaining the said armature in attracted position; and electro-magnetic means for releasing said armature, said electromagnetic means being rendered operative when both switches are returned to normal position.

5. In a controlling system for a machine having driving and driven portions, the combination with a clutch element normally held in disconnecting position but adapted to be released to connect the two aforementioned portions; of a latch member for controlling said clutch element; latch actuating means normally connected to the latch; means for controlling the latch actuator comprising two manually operable elements, said control means requiring that both said manual elements be moved into one position to operate the latch member for releasing the clutch element; means adapted to disconnect the actuating means from the latch member; and means brought into effect only by the return of both of the manually operable elements into normal position to cause the actuating means to be connected with the latch.

6. In an electrical controlling system for a machine having driving and driven members, the combination with a clutch adapted to connect said members; of a clutch controlling latch; a source of electric current; electro-magnetic latch actuating means including a coil and an armature connected to the latch; a plurality of switch contacts operable to one position for closing the circuit between the source of electrical energy and the electromagnetic means for actuating the latch; automatic means for disconnecting the armature and latch after the engaging of the clutch; and means brought into effect by the return of the manually operated contacts to normal position to restore connections between the armature and latch for permitting a subsequent cycle of operations.

7. In a controlling system for a machine having a driving and a driven member normally disconnected, the combination with a clutch device operable to connect said members; of means for controlling the clutch device including two manually operable members, said control means requiring the operation of both manual members to a certain position for effecting a single cycle of machine operation, and restoring means operable only when both manual members are moved to a second position for restoring the control means to its normal arrangement before a subsequent cycle of machine operation can be performed.

8. In a controlling system for a machine having a driving and a driven member, the combination with clutch means for coupling said members; of actuator means for actuating said clutch means; automatic non-repeat means for disconnecting said actuator means from said clutch means; restorer means for reconnecting the actuator means with said clutch means; and a controller including two manually operable members for causing the actuator means to function only when both manual means are moved into a certain position, and for causing the restorer means to function only when both manual members are moved into a second position.

In testimony whereof I hereto affix my signature.

EARL M. POLK.